Figure 1:
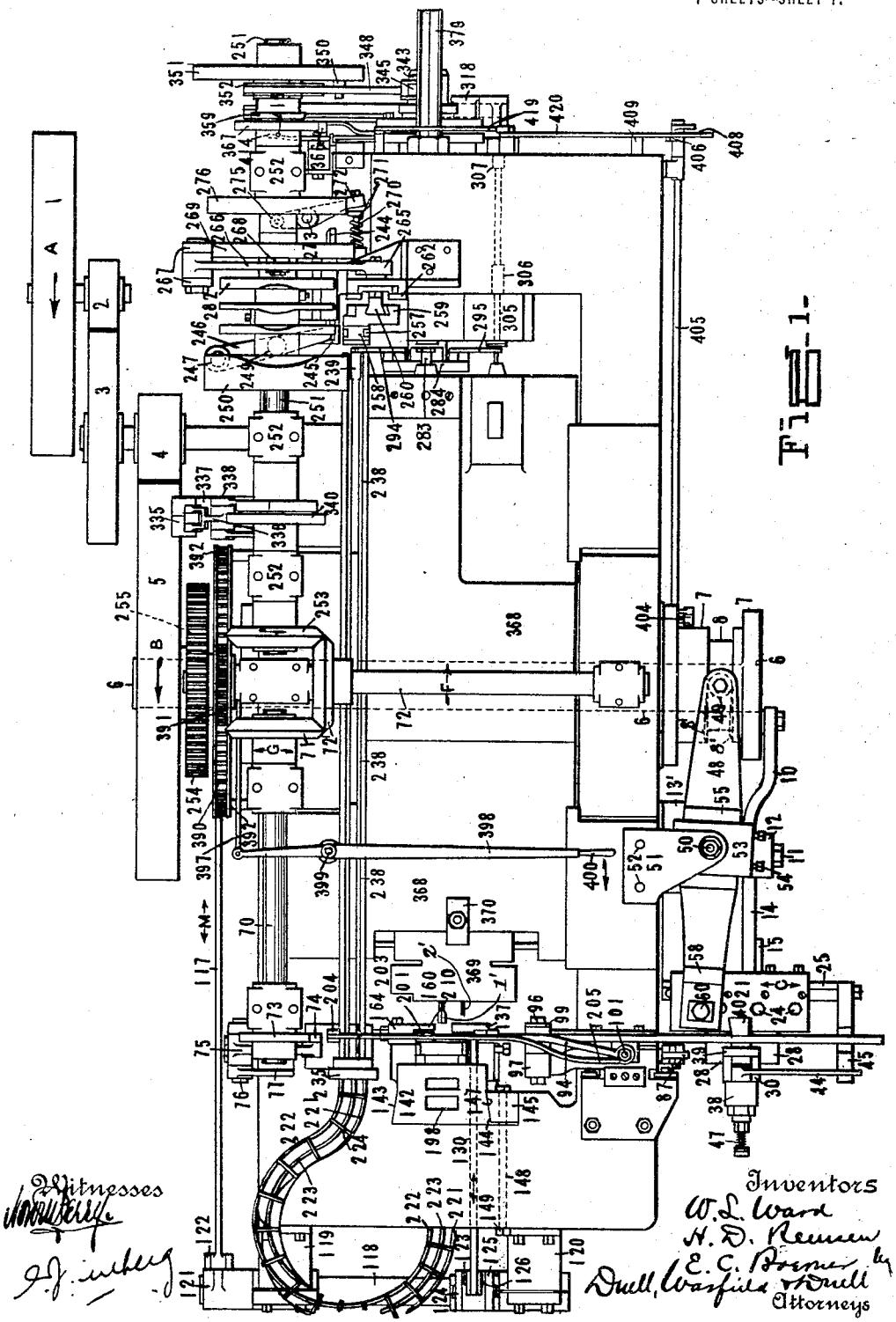

W. L. WARD, H. D. REMSEN & E. C. BOERNER.
NUT MAKING MACHINE.
APPLICATION FILED APR. 27, 1912.

1,206,181.

Patented Nov. 28, 1916.
7 SHEETS—SHEET 1.

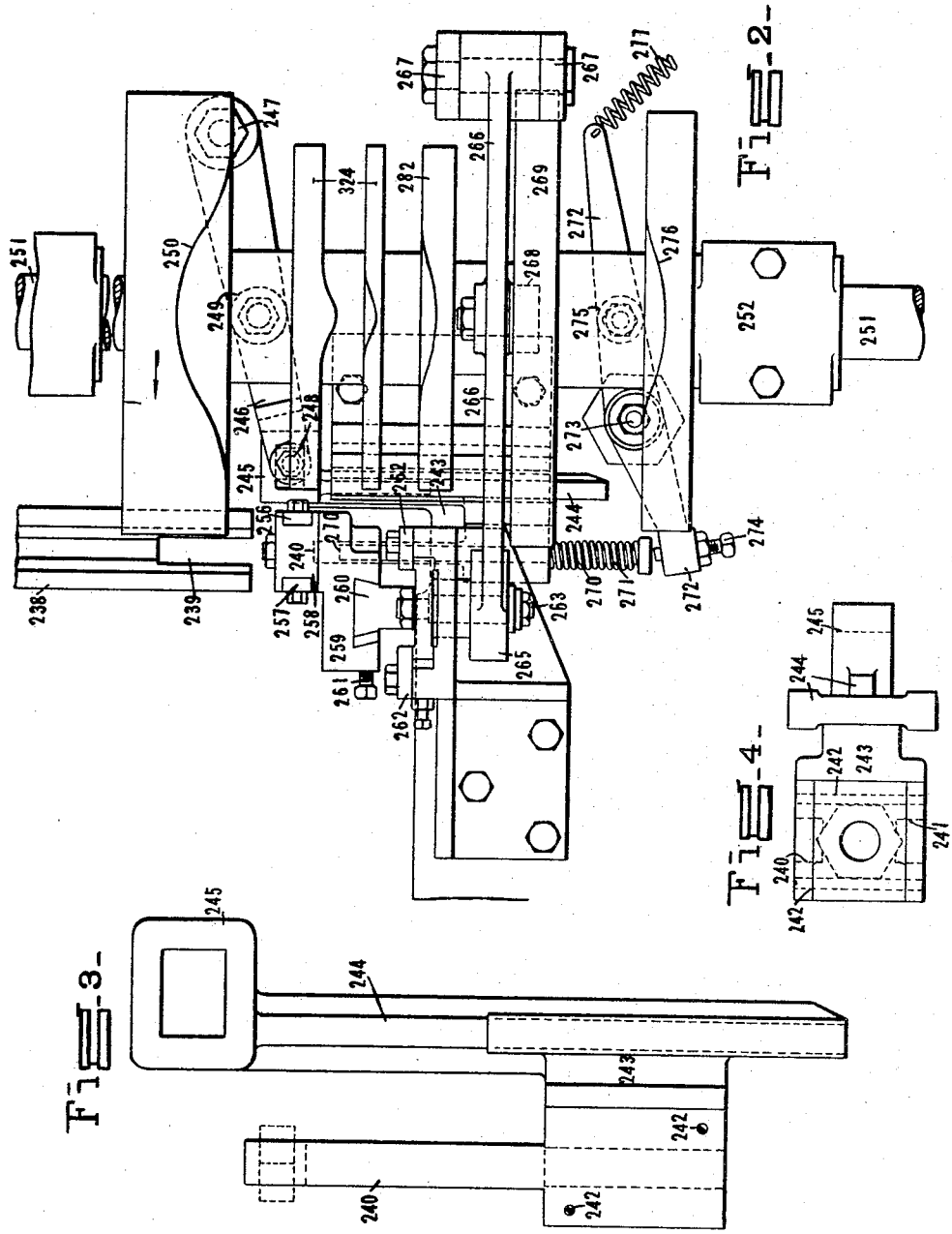

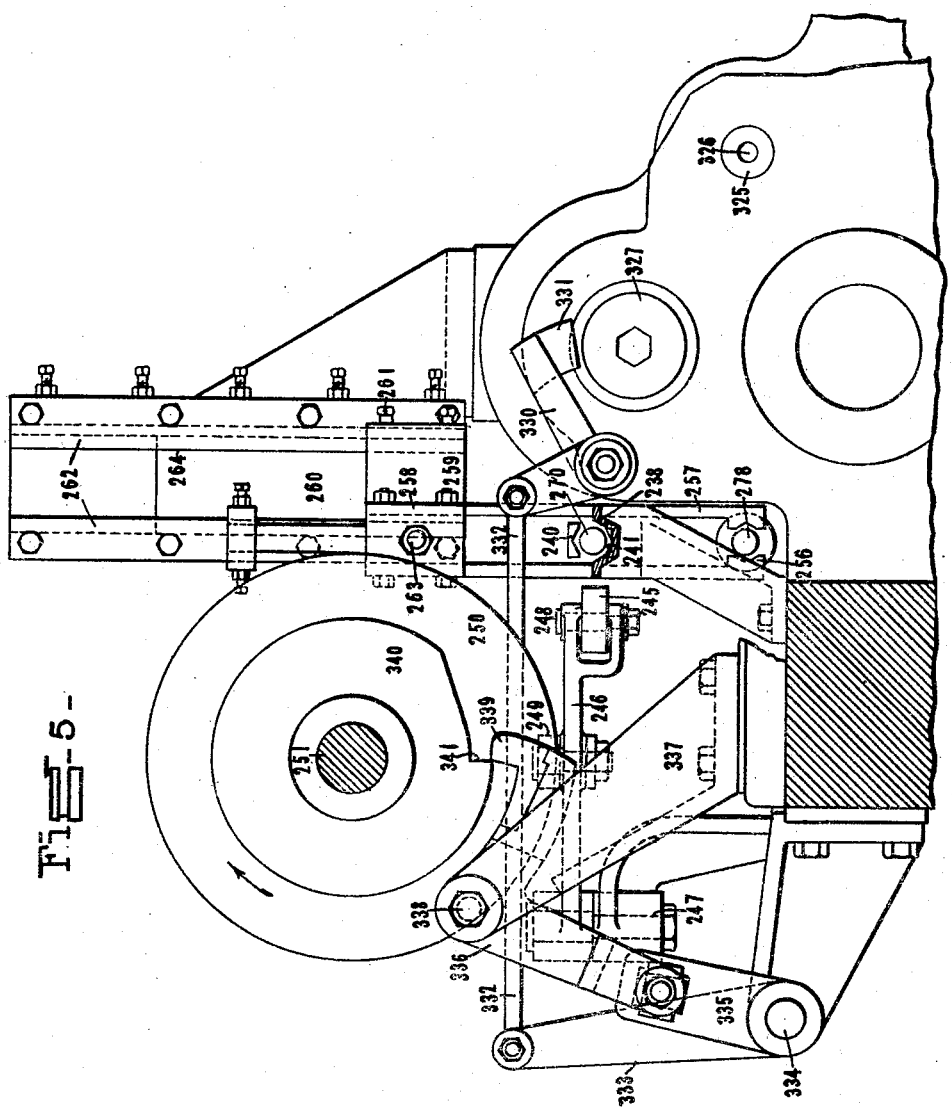

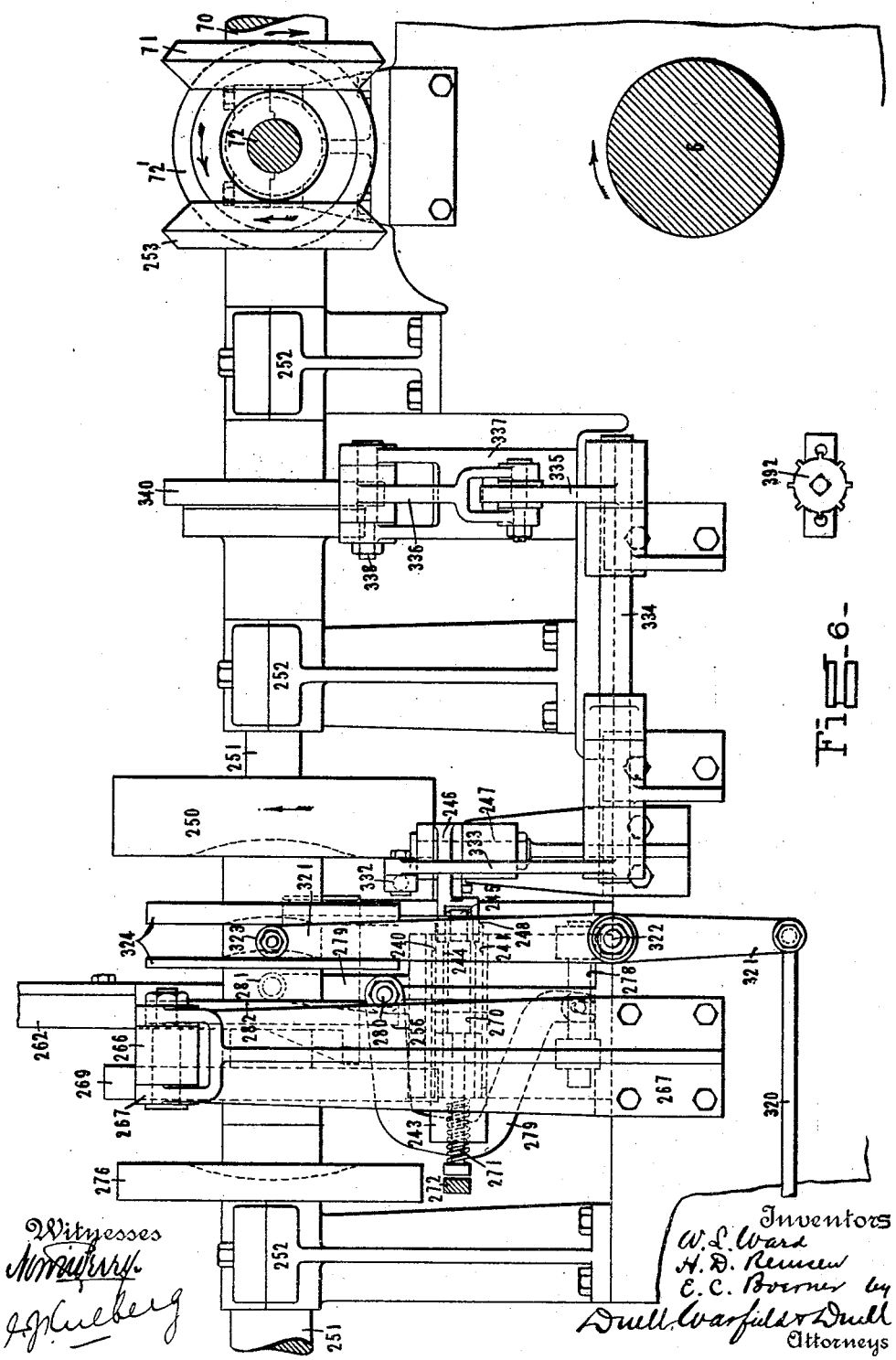

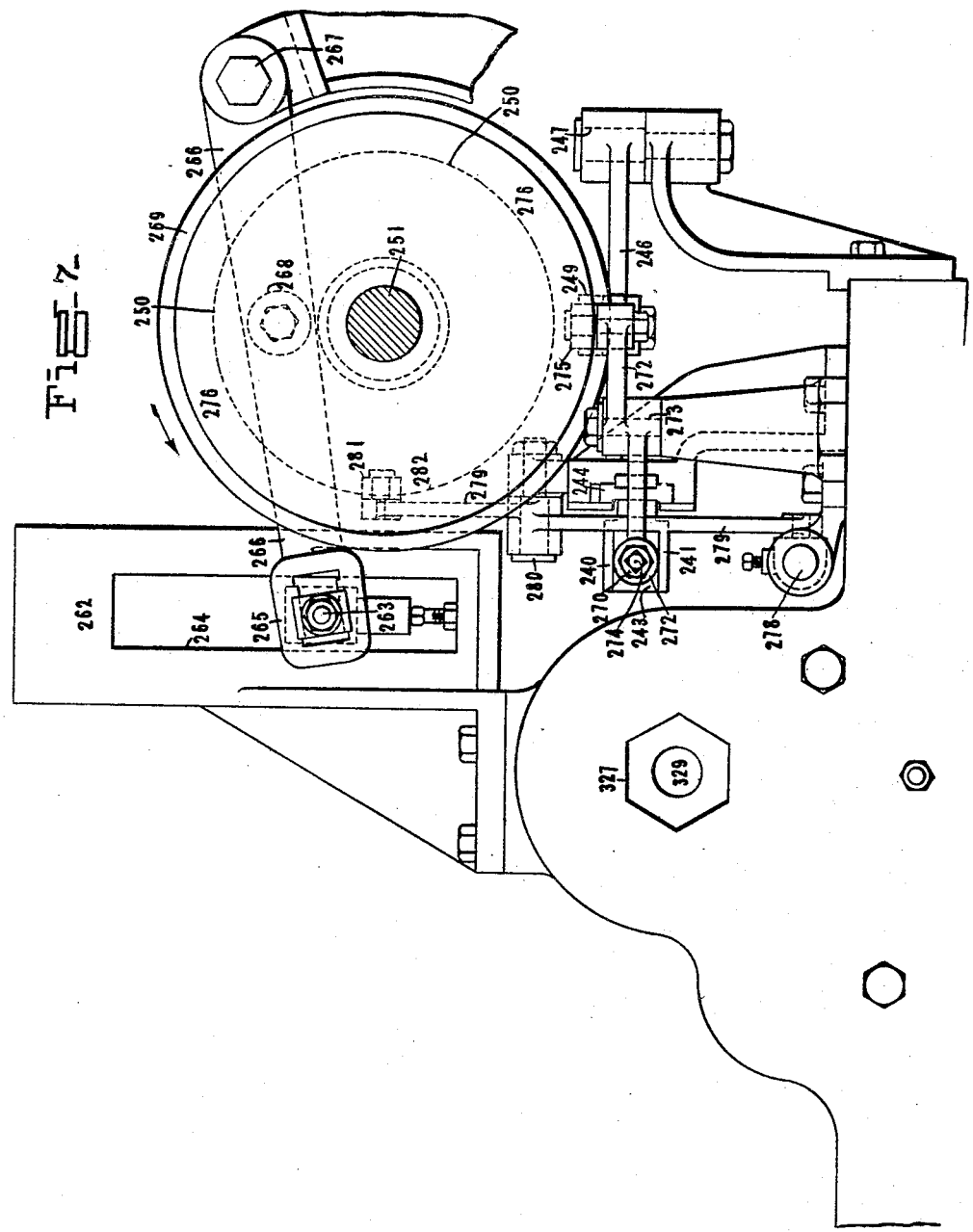

W. L. WARD, H. D. REMSEN & E. C. BOERNER.
NUT MAKING MACHINE.
APPLICATION FILED APR. 27, 1912.
1,206,181.
Patented Nov. 28, 1916.
7 SHEETS—SHEET 6.
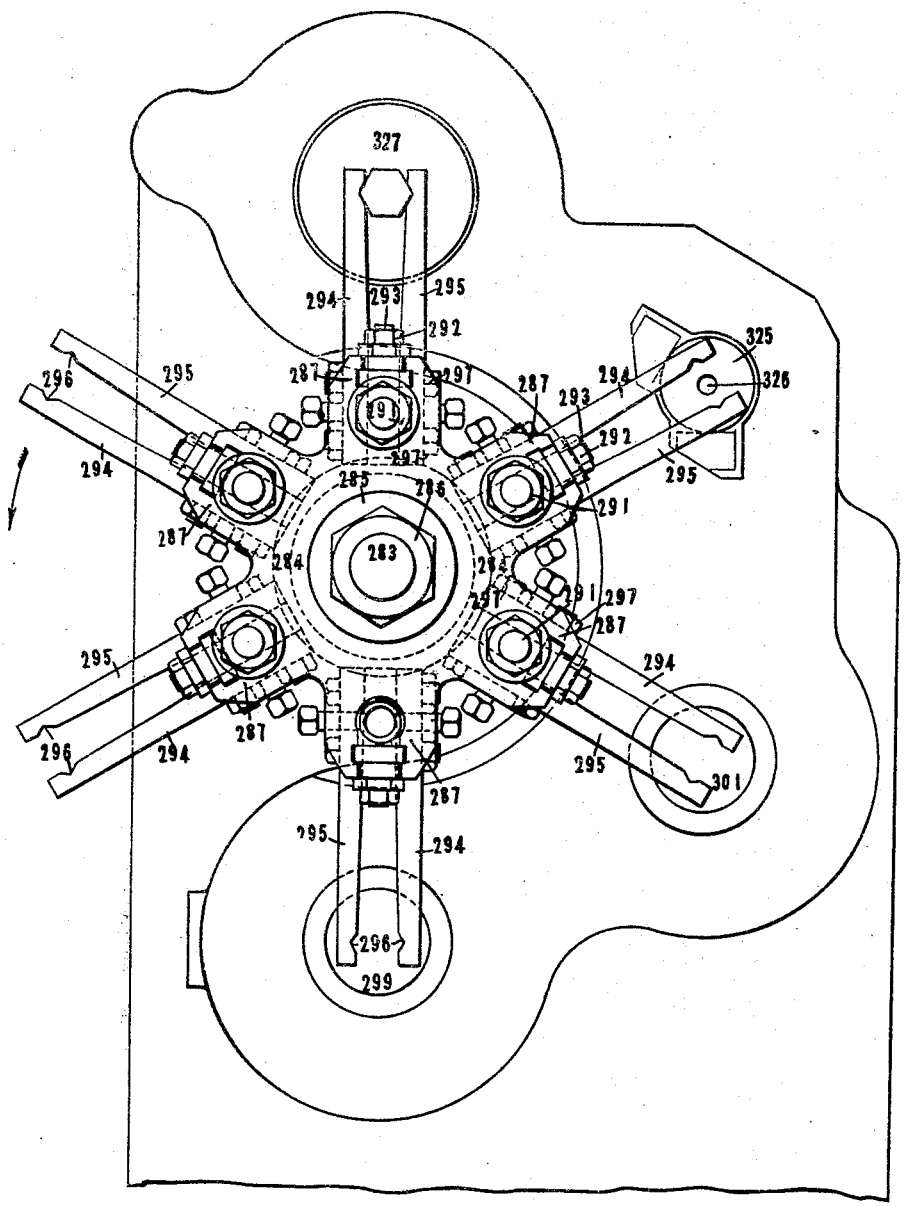
Fig-8-

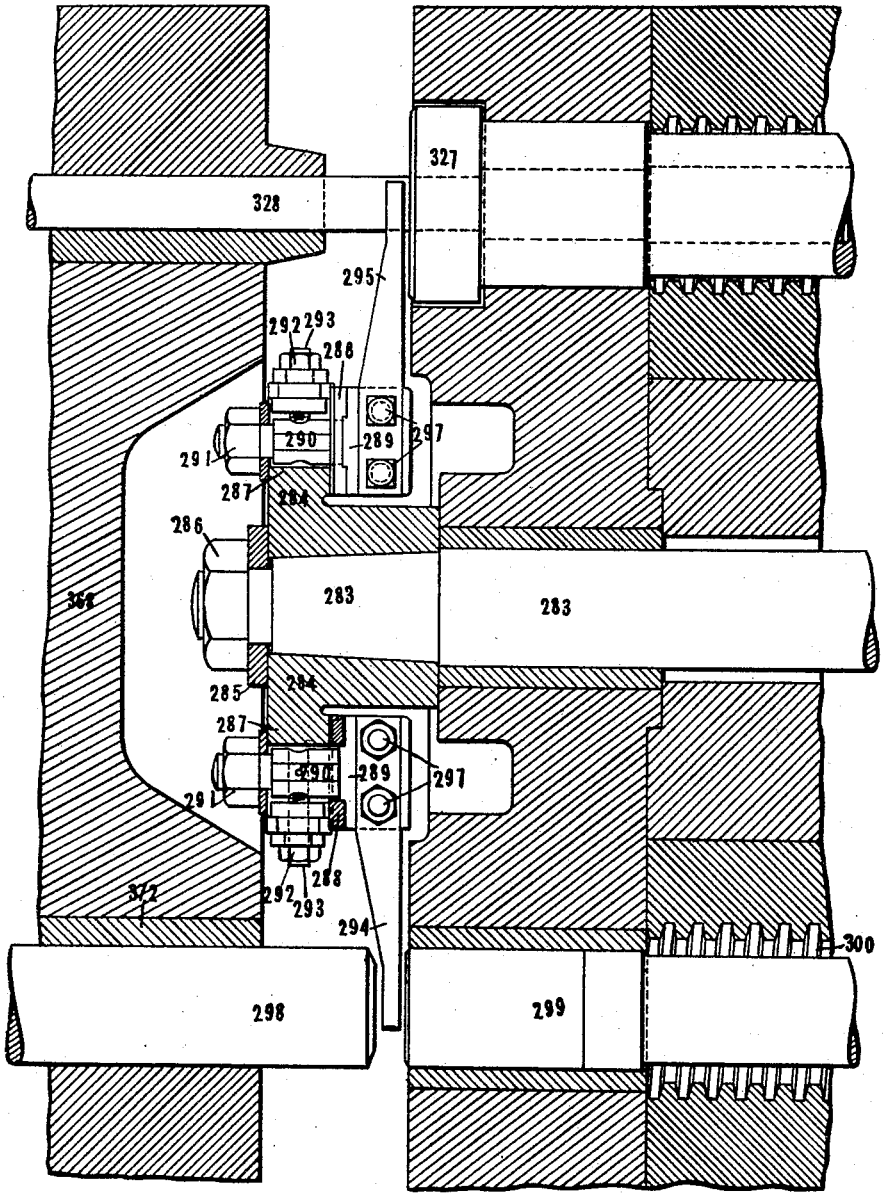

UNITED STATES PATENT OFFICE.

WILLIAM L. WARD, HERBERT D. REMSEN, AND EMILE C. BOERNER, OF PORT CHESTER, NEW YORK, ASSIGNORS TO RUSSELL, BURDSALL & WARD BOLT AND NUT CO., OF PORT CHESTER, NEW YORK, A CORPORATION OF NEW YORK.

NUT-MAKING MACHINE.

1,206,181.  Specification of Letters Patent.  Patented Nov. 28, 1916.

Original application filed June 27, 1910, Serial No. 569,053. Divided and this application filed April 27, 1912. Serial No. 693,606.

*To all whom it may concern:*

Be it known that we, WILLIAM L. WARD, HERBERT D. REMSEN, and EMILE C. BOERNER, citizens of the United States, residing at Port Chester, in the county of Westchester and State of New York, have invented certain new and useful Improvements in Nut-Making Machines, of which the following is a full, clear, and exact description, such as will enable others skilled in the art to which it appertains to make and use the same.

This invention deals with mechanism for transferring articles from a delivering means to a mechanism for performing further operations on the same, and this application is a division of a copending application filed June 27, 1910, Serial No. 569,053.

One object of the invention is to provide a simple and effective mechanism especially capable of handling nut blanks.

A further object of this invention is to adapt for a machine a mechanism for successively receiving roughly formed nut-blanks at one portion of the machine and transporting said blanks in the form of a train to another portion of the machine, and then successively removing individual nut-blanks from the forward end of the train in such manner as to insure precision and regularity of operation irrespective of the ordinary variations in length of the train of blanks.

A further object is to devise a blank-handling mechanism capable of various applications and which will operate on a multiplicity of more or less irregularly disposed blanks, and will deliver such blanks so as to be accurately located in any predetermined position.

Other objects and advantages will be in part pointed out hereinafter and in part rendered apparent by means of the accompanying illustrations.

The invention accordingly consists in the features of construction, combinations of elements and arrangement of parts which will be exemplified in the construction hereinafter set forth, and the scope of the application of which will be indicated in the following claims.

To promote a full understanding as to the manner in which this invention may be carried out, drawings exemplifying a preferred embodiment have been appended as a part of this disclosure, and in such drawings like characters of reference denote corresponding parts throughout the several views, of which—

Figure 1 is a plan view of a general assembly of a complete machine in which is embodied the mechanism herein specifically claimed; Fig. 2 is a plan view showing the delivery end of the conveyer for the nut-blanks and the transfer mechanism for picking nut-blanks from the end of such conveyer and transporting the same to a roulette which carries the blanks through the successive operations of repunching, crowning, retrimming, etc.; Fig. 3 is a detail view of the spring finger or picker forming an element of the transfer mechanism and which comprises two spring arms or tongs adapted to be advanced to spring over and frictionally take hold of a nut-blank located at the extremity of the conveyer 238, then withdraw the same from such conveyer, and ultimately position the same between vertically movable fingers which carry the nut-blank to the roulette; Fig. 4 is a rear end elevation of the picker shown by Fig. 3; Fig. 5 is an elevation of the transfer mechanism as viewed from the end of the nut-blank conveyer, looking in the direction of travel of the nut-blanks, i. e., toward the rear end of the machine; Fig. 6 is a side elevation, showing in part certain of the unobstructed elements of Figs. 2 to 5 inclusive, and disclosing more particularly the arrangement of the cams, levers and other elements which operate the transfer mechanism; Fig. 7 is an end elevation looking forwardly in the direction of the axis of the cam shaft 251 and showing more particularly the lever which actuates the vertically moving tong mechanism, as well as the levers which operate the plungers for transferring the blanks from the horizontally moving tong mechanism to the vertically moving tong mechanism and for transferring them from the latter to the roulette, which carries them through subsequent operations; Fig. 8 is an end elevation showing details of construction of the roulette; and Fig. 9 is a longitudinal vertical section showing further details of the construction of the roulette.

*The conveyer.*—Turning to Fig. 1, there will be seen a track-like slide, or trackway 238 which will normally be loaded with blanks which will be successively introduced into one end, and pushed along toward the discharge end, from which they are successively removed by the apparatus now to be described.

*The mechanism for transferring the nut-blanks from the conveyer to the roulette.*—It may be perceived at this point that, owing to the somewhat rough and irregular contour of the nut-blanks which are pushed along the conveyer, or trackway in the form of a long train of blanks, the foremost nut-blank may be more or less displaced in its position. That is to say, at one time the foremost unit of the train of nut-blanks may be well advanced with respect to the extremity of the conveyer, and at another time it may be positioned more to the rear of such extremity. On the other hand, in an automatic machine of this character one highly important attribute to smoothness and positiveness of action will reside in an accurate and unfailing placing of the nut-blanks. In order, therefore, to provide a mechanism having the capacity of compensating for the variable positions of the nut-blanks at the delivery end of the conveyer, this invention proposes to intervene what may be termed a picker mechanism between the conveyer and the roulette which carries the nuts through the various finishing operations, such as crowning, repunching, retrimming and the like. According to this invention a device such as that shown by Fig. 3 and comprising a pair of tong-like spring arms is mounted adjacent the extremity of the conveyer and adapted to horizontally reciprocate so as to advance into engagement with, preferably, the lateral, or peripheral portion, of the nut-blank carried at the end of said conveyer and withdraw the same therefrom, and thus positively position the same in a predetermined vertical plane. This mechanism is shown more plainly by Figs. 2 to 6 inclusive.

Turning first to Figs. 3 and 4, a pair of spring fingers or tongs 240 and 241 are secured, by means of screws such as 242 to a block 243 so as to lie parallel with one another, but spaced apart approximately somewhat less than the maximum diagonal of a nut-blank. This block 243 is mounted to slide in a horizontal direction in a suitable stationary part of the frame of the machine, as shown by the drawings, and is actuated through an extension 244, which terminates in the slotted end 245. An actuating lever 246 is pivoted at its one end to the pivot pin 247 and at its other end carries the pin 248, which moves in the slot in the end 245. This lever is actuated by means of the roller 249 which rides in contact with the periphery of the cam 250 which is fixed to a shaft 251 mounted in journal boxes 252 arranged at one side of the machine and said roller 249 may be held in contact with cam 250 by any suitable means, such as the usual spring. This shaft 251 is in turn driven by the beveled gear 253 in mesh with the gear 72' which is secured to the shaft 72, which at one end carries the gear 254 in mesh with the gear 255 mounted on the main shaft 6. As a result of this mechanism, the spring fingers or tongs 240 and 241 are caused to advance toward the end of the nut-blank conveyer 238 and, by reason of the slot 239 they are able to pass over and frictionally grip the nut-blank at the head of the train of blanks. Consequently, during the withdrawal of the spring fingers or tongs 240 and 241, this nut-blank will be removed and carried to a position such that it may be engaged by a second pair of tongs or fingers, which are arranged to slide vertically and transversely to the movement of said first-mentioned tongs. The second tongs are shown more clearly by Figs. 5 and 2 and indicated by reference numerals 256 and 257. These second tongs are secured to a block 258 fixed to a member 259, which is in turn adjustably fixed in position on a vertically reciprocating block 260 by means of the screws 261. This block slides vertically in the ways 262, and has a pivot pin 263 projecting rearwardly through slot 264 in the vertical ways 262 (see Fig. 7). This pivot pin 263 carries a conventional form of sliding block which slidably connects with the end 265 of the vertically oscillating lever 266. This lever is pivoted at its distant end to the pivot 267 and is actuated by means of an intermediately located roller 268 in engagement with the cam 269 (see Figs. 2 and 6), also fast to the shaft 251. Preferably the cam 269 comprises the usual cam groove with which the roller 268 engages.

It will, from the foregoing, be understood that when the first tong mechanism withdraws the nut-blank from the end of the conveyer, such blank is to be transferred to the vertically moving pair of tongs. This is accomplished by means of an upper plunger 270, which reciprocates between the tongs 240 and 241, and which is normally held in a retracted position by means of the spring 271 (see Fig. 2). At the proper instant, this plunger is advanced and pushes the nut-blank from between the tongs 240 and 241, and then between the tongs 256 and 257, it being, of course, understood that the latter tongs are now in their elevated position through the operation of the lever 266. The means for operating the plunger 270 consists in a lever 272 (shown more clearly by Figs. 2 and 7), which is pivoted at an intermediate point to the pivot pin 273 carried by a suitable standard rising from the frame of the machine. The actuating end of this lever carries an adjustable screw 274 which, during the forward advance of the lever impacts against the end of the plunger 270 and in turn advances the same. The lever 272 is actuated by means of a roller 275 which contacts with the cam 276 fixed to the shaft 251. A spring 277 (shown in Fig. 2) operates to keep the roller 275 properly pressed against the cam surface 276. The spring 277 is stronger than the spring 271.

In order to transfer the blanks from the vertically moving tongs, this invention proposes a lower plunger 278. This is shown more clearly by Figs. 5, 6 and 7. This plunger 278 reciprocates horizontally and is pivotally connected with an uprising bent lever 279, which is pivoted at 280, and at its upper end carries the roller 281 which rides around the cam 282 and is intermittently actuated thereby. Roller 281 may be held in contact with the cam 282 by any suitable means, such as the usual spring. Consequently, each time the plunger 278 operates, a nut-blank will be forced from the vertically moving tongs and will be received by the adjacent spoke of the roulette or spoke-like structure, as will be presently described. Through this mechanism the blanks are very certainly and accurately positioned and transported through the several finishing operations.

*The roulette for carrying the nut-blanks through the successive finishing operations.*— The detailed construction of the preferred form of roulette, or carrier, which supports the nut blanks during the refinishing, or reshaping, operations, is shown more particularly by Figs. 8 and 9. A shaft 283 passes from the rear or discharge end of the machine through the main frame, and terminates adjacent the end of the double-headed reciprocating punch-carrying frame. At its forward end, this shaft tapers and carries the hub 284 of the roulette. This hub is securely retained in position by means of a pressure plate 285, which is positioned by the nut 286 on the end of the shaft 283. The hub of this roulette provides a series of equi-spaced radiating spoke-like members 287, 287, 287, and, inasmuch as these are similar in character, but one need be described. This radiating portion extends to the rear, *i. e.*, in an axial direction, a little less than one-half the total length of the hub 284 and provides a grooved channel or trackway in which an intervening block 288 may slide in a radial direction, but is restrained against any other movement relative to the part 284. A tong-block 289 has a transverse movement on the intervening block 288, as shown more clearly by Fig. 9, so as to permit of slight lateral adjustment of such block if desired. The block extends forwardly in the form of a shank 290 which carries the nut 291 at its foremost extremity. This nut enables the parts to be secured rigidly in place by clamping the same up. For the purpose of securing exact radial adjustments of the block 289, a nut 292, which engages the radial bolt 293, is provided, as will be understood. Each arm or spoke of this roulette is formed by a pair of spring fingers 294 and 295, which, adjacent their extremities, provide V-shaped nicks 296 adapted to engage the corners of the hexagonal nut-blanks and hold the same with sufficient firmness by reason of the spring tension of the arms or fingers 294 and 295. These fingers are in turn secured to the tong-blocks 289 by means of appropriate nuts and bolts, indicated by 297. This roulette is arranged and disposed as shown more clearly by Fig. 1, so that as the shaft 283 is intermittently rotated through an angle of 60 degrees, the spring fingers of the roulette will move in an endless path and successively pass by a position directly opposite the plunger 278 which forces the blank from the above-described vertically moving carrier to the finger of the roulette which is at the instant in registry therewith. In this way every time the plunger 278 operates, a nut-blank will be positioned in the roulette. The blank is first carried through a sixth of a revolution of the roulette, as indicated by the arrow on Fig. 8, so as to bring it into position opposite the flattening punch 298 which is mounted on one end of the double-ender reciprocating punching head. The nut-blank is supported from the other side by the anvil 299 which is adjustably mounted in the stationary part of the main frame as by means of the adjusting screw 300. This is shown best by Fig. 9. It will thus be seen that this transfer mechanism acts as an intermediary between a source of blanks, on the one hand, and means for performing operations on said blanks, on the other hand.

Having described our invention, what we claim as new and desire to secure by Letters Patent, is:—

1. A machine of the nature disclosed comprising, in combination, a trackway for a train of blanks, a pair of spring-tongs adapted to be reciprocated toward the end of said trackway to enable said tongs to frictionally engage the blank at the head of the train of blanks, and means for operating said tongs whereby the blanks may be successively removed from the end of said trackway.

2. A machine of the nature disclosed comprising, in combination, a trackway for a train of nut blanks, a pair of spring-fingers mounted opposite the end of said trackway and adapted to reciprocate toward the same, and means operative to reciprocate said fingers to enable the latter to successively withdraw blanks from said trackway.

3. A machine of the nature disclosed comprising, in combination, a conveyer for a train of blanks, a pair of spring-fingers mounted opposite the end of said conveyer and adapted to advance into engagement with a blank at the head of said train to engage and remove the same from said conveyer, a plunger for forcing the blank from said fingers, a spring normally maintaining said plunger in its retracted position, and means operative against the resistance of said spring adapted to reciprocate said plunger.

4. A machine of the nature disclosed comprising, in combination, a conveyer for a train of blanks, a pair of spring-fingers mounted opposite the end of said conveyer and adapted to reciprocate in alinement with said conveyer, a plunger, a spring normally maintaining said plunger out of proximity with a blank, and intermittent means operative against the resistance of said spring adapted to advance said plunger to discharge a blank.

5. A machine of the nature disclosed comprising, in combination, a trackway for a train of blanks, a pair of spring-fingers slidably mounted in alinement with said trackway, a plunger, a spring normally maintaining said plunger in retracted relation with respect to said fingers, mechanism co-acting with said plunger to actuate the same against the resistance of said spring, and cam means adapted to intermittently operate said mechanism to cause a reciprocation of said plunger.

6. A machine of the nature disclosed comprising, in combination, a trackway for a train of blanks, a pair of spring-tongs adapted to be reciprocated toward the end of said trackway to enable said tongs to frictionally engage a blank at the head of the train of blanks, means for operating said tongs whereby the blanks may be successively withdrawn from the end of said trackway, and a mechanism movable transversely to said tongs adapted to receive the blanks carried thereby.

7. A machine of the nature disclosed comprising, in combination, a trackway for a train of blanks, a pair of spring-fingers mounted opposite the end of said trackway and adapted to reciprocate toward the same, a plunger, a spring maintaining said plunger in a normal position, means operative against the resistance of said spring adapted to reciprocate said plunger to enable the latter to successively discharge blanks from said fingers, and a mechanism movable transversely to said fingers adapted to receive the blank discharged therefrom.

8. A machine of the nature disclosed comprising, in combination, a trackway for a train of blanks, a pair of spring-fingers mounted opposite the end of said trackway and adapted to advance into engagement with a blank at the head of said train to engage and remove the same from said trackway, a plunger, a spring normally retaining said plunger in its retracted position, means operative against the resistance of said spring adapted to reciprocate said plunger, and a mechanism movable transversely to said fingers adapted to receive the blank discharged by said plunger.

9. A machine of the nature disclosed comprising, in combination, a conveyer for a train of blanks, a pair of spring-fingers mounted opposite the end of said conveyer and adapted to reciprocate in alinement with said conveyer, a plunger, a spring normally maintaining said plunger retracted relative to said fingers, intermittent means operative against the resistance of said spring adapted to advance said plunger, and a mechanism movable transversely to said fingers adapted to receive the blank discharged by said plunger.

10. A machine of the nature disclosed comprising, in combination, a trackway for a train of blanks, a pair of spring-fingers slidably mounted in alinement with said trackway, a plunger, a spring normally maintaining said plunger retracted relative to said fingers, mechanism co-acting with said plunger to actuate the same against the resistance of said spring, cam means adapted to move intermittently to cause a reciprocation of said fingers, and a mechanism movable transversely to said fingers adapted to receive the blank discharged by said plunger.

11. A machine of the nature disclosed comprising, in combination, a conveyer for a train of blanks, a device having a pair of spring-tongs adapted to be reciprocated toward the end of said conveyer to enable said tongs to frictionally engage a blank at the head of the train of blanks, means for operating said device whereby the blanks may be successively withdrawn from the end of said conveyer, a mechanism comprising a pair of spring-tongs arranged transversely to said first-mentioned tongs and adapted to receive the blank carried thereby, and means for reciprocating said mechanism transversely to the movement of said device.

12. A machine of the nature disclosed comprising, in combination, a conveyer for a train of blanks, a device comprising a pair of spring-arms mounted opposite the end of said conveyer and adapted to reciprocate toward the same, a plunger, a spring maintaining said plunger in a normal position, means operative against the resistance of said spring adapted to reciprocate said plunger, to enable the latter to successively force blanks from said device, a mechanism comprising a pair of spring-tongs arranged and movable transversely to said device and adapted to receive the blank discharged therefrom, and means for reciprocating said mechanism.

13. A machine of the nature disclosed comprising, in combination, a trackway for a train of blanks, a pair of spring-tongs adapted to be reciprocated toward the end of said trackway to enable said tongs to frictionally engage the blank at the head of the train of blanks, means for coöperating with said tongs whereby the blanks may be successively removed from the end of said trackway and brought to a predetermined position, and a reciprocating head having an implement adapted to advance to operate on said blank.

14. A machine of the nature disclosed comprising, in combination, a conveyer for a train of blanks, a pair of spring-fingers mounted opposite the end of said conveyer and adapted to advance into engagement with a blank at the head of said train to engage the same and remove it from said conveyer, a plunger for forcing the blank from said fingers, a spring normally maintaining said plunger in its retracted position, means operative against the resistance of said spring adapted to reciprocate said plunger to force the blank from said fingers, a mechanism adapted to receive the blank and carry the same into a predetermined position, and a reciprocating head carrying an implement adapted to operate on said blank when so positioned.

15. A machine of the nature disclosed comprising, in combination, a conveyer for a train of blanks, a pair of spring-fingers mounted opposite the end of said conveyer and adapted to reciprocate in alinement with said conveyer, a plunger, a spring normally maintaining said plunger out of the path of a blank, intermittent means operative against the resistance of said spring adapted to advance said plunger to discharge a blank, a roulette adapted to receive said blank, and a reciprocating head having an implement adapted to operate on said blank while held by said roulette.

16. A machine of the nature disclosed comprising, in combination, a conveyer for a train of blanks, a device comprising a pair of spring-fingers slidably mounted in alinement with said conveyer, a plunger, a spring normally maintaining said plunger retracted relative to said fingers, mechanism co-acting with said plunger to actuate the same against the resistance of said spring, cam means adapted to intermittently operate said mechanism to cause a reciprocation of said plunger, means for receiving and positioning the blank discharged by said plunger, and a reciprocating head carrying an implement adapted to operate on said positioned blank.

17. A machine of the nature disclosed comprising, in combination, a trackway for a train of blanks, a pair of spring-tongs adapted to be reciprocated toward the end of said trackway to enable said tongs to frictionally engage a blank at the head of a train of blanks, means for operating said tongs whereby the blanks may be successively withdrawn from the end of said trackway, a mechanism movable transversely to said tongs adapted to receive the blanks carried thereby, means coöperating with said mechanism for positioning said blanks, and a reciprocating head having an implement adapted to operate on the positioned blanks.

18. A machine of the nature disclosed comprising, in combination, a conveyer for a train of blanks, a device comprising a pair of spring-fingers mounted opposite the end of said conveyer and adapted to reciprocate toward the same, a plunger, a spring maintaining said plunger in a normal position, means operative against the resistance of said spring adapted to reciprocate said plunger to enable the latter to successively discharge blanks from said device, a mechanism movable transversely to said device adapted to receive the blank discharged therefrom, a second mechanism coöperating with said first-mentioned mechanism for receiving the blank from the former and positioning the same, and a reciprocating head having an implement adapted to operate on said blanks while held by said second mechanism.

19. A machine of the nature disclosed comprising, in combination, a conveyer for a train of blanks, a pair of spring-fingers mounted opposite the end of said conveyer and adapted to advance into engagement with a blank at the head of said train to engage the same and remove it from said conveyer, a plunger, a spring normally retaining said plunger in its retracted position, means operative against the resistance of said spring adapted to reciprocate said plunger, a mechanism movable transversely to said fingers adapted to receive the blank discharged by said plunger, means for accurately positioning the blanks, and a reciprocating head having an implement adapted to operate on the blanks so positioned.

20. A machine of the nature disclosed comprising, in combination, a conveyer for a train of blanks, a pair of spring-fingers mounted opposite the end of said conveyer adapted to reciprocate in alinement with said conveyer, a plunger, a spring normally maintaining said plunger retracted relative to said fingers, intermittent means operative against the resistance of said spring adapted to advance said plunger, a mechanism movable transversely to said fingers adapted to receive a blank discharged by said plunger, a second mechanism coöperating with said first-mentioned mechanism for accurately positioning the blanks, and a reciprocating head having an implement for operating on the blanks so positioned.

21. A machine of the nature disclosed comprising, in combination, a conveyer for a train of blanks, a device comprising a pair of spring-fingers slidably mounted in alinement with said conveyer, a plunger, a spring normally maintaining said plunger retracted relative to said fingers, mechanism coacting with said plunger to actuate the same against the resistance of said spring, cam means adapted to move intermittently to cause a reciprocation of said device, a mechanism movable transversely to said device adapted to receive the blank discharged by said plunger, a second mechanism for receiving the blank from said first-mentioned mechanism to carry the same through successive positions, and a reciprocating head having a plurality of implements adapted to successively operate on said blank as the latter assumes its successive positions.

22. A machine of the nature disclosed comprising, in combination, a conveyer for a train of blanks, a device having a pair of spring-tongs adapted to be reciprocated toward the end of said conveyer to enable said tongs to frictionally engage a blank at the head of the train of blanks, means for operating said device whereby the blanks may be successively withdrawn from the end of said conveyer, a mechanism comprising a pair of spring-tongs arranged transversely to said first-mentioned tongs and adapted to receive the blank carried thereby, means for reciprocating said mechanism transversely to the movement of said device, a roulette for receiving the blanks from said mechanism and for bringing the same into a succession of predetermined positions, and a reciprocating head having a plurality of implements adapted to operate on said blanks while held by said roulette.

23. A machine of the nature disclosed comprising, in combination, a conveyer for a train of blanks, a device comprising a pair of spring-arms mounted opposite the end of said conveyer and adapted to reciprocate toward the same, a plunger, a spring maintaining said plunger in a normal position, means operative against the resistance of said spring adapted to reciprocate said plunger to enable the latter to successively force blanks from said device, a mechanism comprising a pair of spring-tongs arranged and movable transversely to said device and adapted to receive the blank discharged therefrom, means for reciprocating said mechanism, a roulette adapted to receive a blank from said mechanism, and a reciprocating head having a plurality of implements adapted to simultaneously operate on a plurality of blanks carried by said roulette.

24. A machine of the nature disclosed comprising, in combination, a trackway for a train of blanks, a pair of spring tongs adapted to be reciprocated toward the end of said trackway to enable said tongs to frictionally engage the blank at the head of the train of blanks while in the trackway, and means for operating said tongs whereby the blanks may be successively removed from said trackway.

25. A machine of the nature disclosed comprising, in combination, a trackway for a train of blanks, a pair of spring tongs adapted to be reciprocated toward the end of said trackway to enable said tongs to frictionally engage the blank at the head of the train of blanks while in the trackway, means for operating said tongs whereby the blanks may be successively removed from said trackway, and a plunger adapted to force successive blanks from said tongs.

26. A machine of the nature disclosed comprising, in combination, a conveyer for a train of blanks, a spring gripper adapted to be reciprocated toward the end of said conveyer to enable said gripper to frictionally engage the blank at the head of the train of blanks while in the conveyer, blank holding mechanism adapted to move in a path at an angle to said gripper, and means adapted to transfer blanks from said gripper to said holding mechanism and cause said blanks to coöperate with said holding mechanism so as to be retained thereby while said holding mechanism is at rest.

27. A machine of the nature disclosed comprising, in combination, a conveyer for a train of nut blanks, a carrier comprising a plurality of nut blank supporting devices movable in an endless path, mechanism adapted to simultaneously perform reshaping operations on a plurality of nut blanks supported by said carrier, and means adapted to successively transfer nut blanks from said conveyer to said supporting devices comprising a plurality of pairs of movable fingers adapted to support nut blanks and means adapted to transfer nut blanks from one of said pairs of fingers to another.

28. A machine of the nature disclosed comprising, in combination, a conveyer for a train of nut blanks, a carrier comprising a plurality of nut blank supporting devices movable in an endless path, mechanism adapted to simultaneously perform reshaping operations on a plurality of nut blanks supported by said carrier, and means adapted to successively transfer nut blanks from said conveyer to said supporting devices comprising a plurality of pairs of movable fingers adapted to support nut blanks by engagement with peripheral portions thereof and means adapted to transfer nut blanks from one of said pairs of fingers to another.

29. A machine of the nature disclosed comprising, in combination, a conveyer for a train of nut blanks, a carrier comprising a plurality of nut blank supporting devices movable in an endless path, mechanism adapted to simultaneously perform reshaping operations on a plurality of nut blanks supported by said carrier, and means adapted to successively transfer nut blanks from said conveyer to said supporting devices comprising a plurality of pairs of movable spring fingers adapted to support nut blanks by engagement with peripheral portions thereof and means adapted to transfer nut blanks from one of said pairs of fingers to another.

30. A machine of the nature disclosed comprising, in combination, a conveyer for a train of nut blanks, a carrier comprising a plurality of nut blank supporting devices movable in an endless path, mechanism adapted to simultaneously perform reshaping operations on a plurality of nut blanks supported by said carrier, and means adapted to successively transfer nut blanks from said conveyer to said supporting devices comprising a reciprocatory pair of fingers adapted to advance and grip a nut blank at the head of the train of blanks and remove the same from said conveyer, a second pair of fingers reciprocable transversely of the first-mentioned pair, a plunger adapted to transfer a nut blank from the first pair to the second pair at a predetermined relative position of said pairs and a second plunger adapted to transfer a nut blank from said second pair of fingers to one of said nut blank supporting devices.

In testimony whereof we affix our signatures in the presence of two witnesses.

WILLIAM L. WARD.
HERBERT D. REMSEN.
EMILE C. BOERNER.

Witnesses:
ROBERT J. SNYDER,
HOWARD E. MARSHALL.